March 10, 1931.    A. J. VIKEN    1,795,747
TRIPOD
Filed Oct. 22, 1928
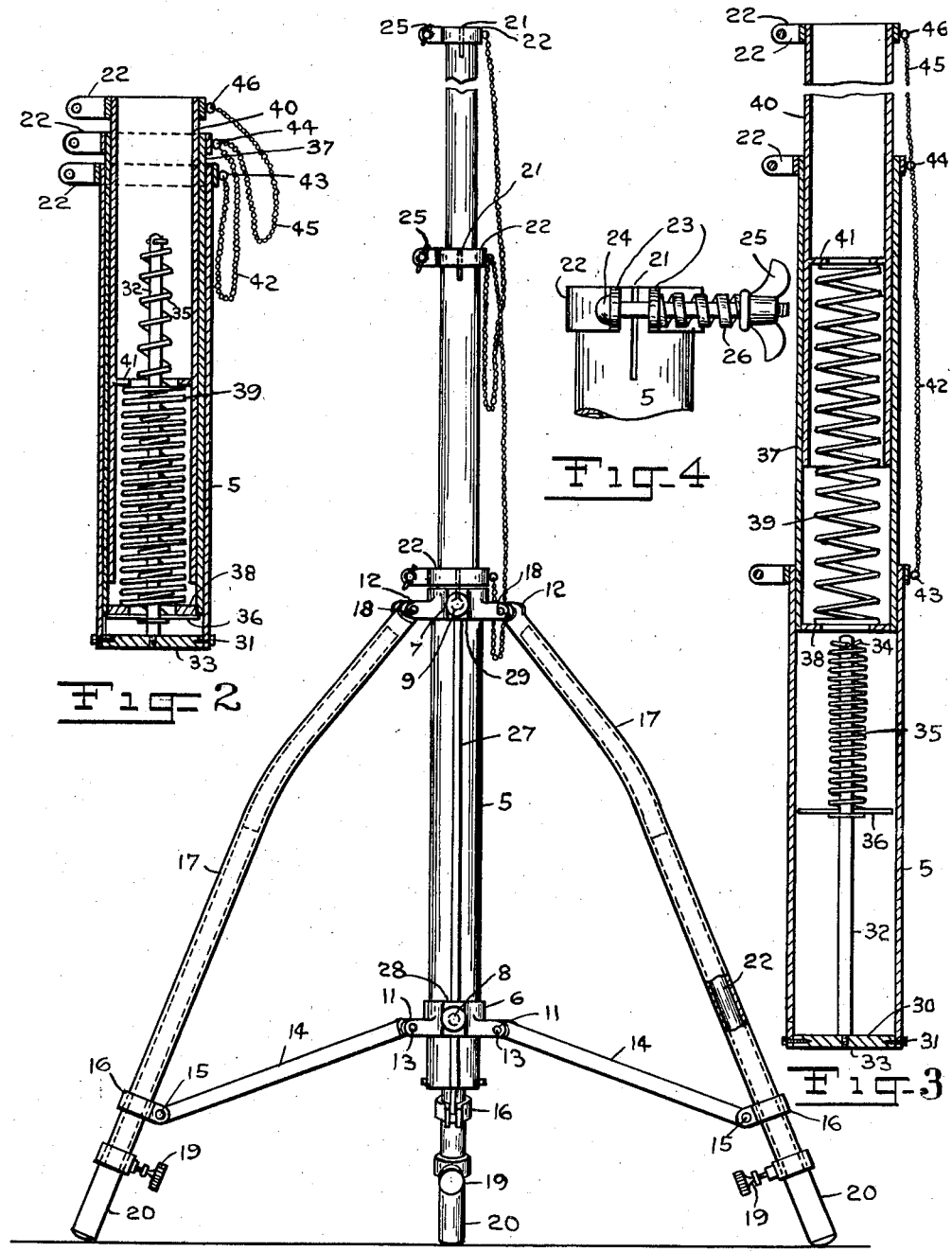

Patented Mar. 10, 1931

1,795,747

UNITED STATES PATENT OFFICE

ANTONIUS J. VIKEN, OF JACKSON HEIGHTS, NEW YORK, ASSIGNOR TO UNDERWOOD & UNDERWOOD, INC., OF NEW YORK, N. Y., A CORPORATION OF DELAWARE

TRIPOD

Application filed October 22, 1928. Serial No. 314,127.

My invention relates to an improvement in a tripod and the novelty consists in the adaptation and arrangement of parts as will be more fully hereinafter pointed out.

In taking portraits of children it is very essential that the camera as it is supported on the tripod shall be raised and lowered easily and quickly and without vibration.

Also it has always been difficult to raise a telescoped tripod without great effort because of gravity and the close fit of the parts.

My device overcomes all of these difficulties and solves the problems in a very simple and effective manner enabling the operator to easily raise the tripod through the telescoped parts as well as lower the same and secure it in the desired position quickly as well as easily.

Referring to the drawings Figure 1 is a front elevation of my tripod with certain portions being broken away for convenience in illustration and in order to show the interior of the construction.

Figure 2 is a vertical section of the central or body portion of my tripod with the telescoped parts fully telescoped.

Figure 3 is the same as Figure 2 but showing the telescoped parts in extended positions.

Figure 4 is a detail of the clamping or locking means used at the head of each of the telescoping parts.

In the drawings 5 is the lower or main telescoping member of my tripod over which are mounted in the usual manner sliding ring members 6 and 7 adapted to be locked in any desired position by means of the usual set screws 8 and 9. The sliding ring members 6 and 7 have integrally projecting from their sides jaws 11 and 12 respectively and in the jaws 11 are pivotally mounted at 13 arms 14 which at their outer ends are pivotally mounted at 15 in slide rings 16 which are mounted over legs 17. The legs 17 are pivotally mounted at their upper ends in jaws 12 in the usual well known manner at 18. At the lower ends of the legs 17 are mounted in the usual manner set screws 19 and extension leg members 20, which slide in the legs 17, are controlled by said set screws 19.

The upper end of the telescoping member 5 is slotted at 21 on either side of said member to permit sufficient movement of the upper ends of the telescoping member 5 to clamp effectively together when a circular clamp member 22 having the usual tabs 23 is brought together by means of the bolt 24 and wing nuts 25 under the gradual pressure of a square spring 26 mounted over said bolt 24.

The telescoping member 5 also has a longitudinal ridge 27 integrally formed on its exterior over which set screw housing portions 28 and 29 of sliding ring members 6 and 7 respectively slide and whereby said ridge 27 acts as a track or guideway for said clamping ring members 6 and 7 keeping them in perfect alignment.

In the base of the telescoping member 5 is rigidly mounted a plate 30 by means of screws 31 and a vertical supporting shaft 32 is mounted at 33 in said plate 30 and carries at its upper end mounted therethrough at 34 a tension spring 35. To the lower end of the tension spring 35 is secured a circular plate 36.

An intermediate telescoping member 37 is mounted in the telescoping member 5 so as to slide freely therein and said telescoping member 37 has a circular flange 38 at its base which is adapted to support a compression spring 39 which is mounted in the telescoping member 37 and the flange 38 also is adapted to rest on the circular plate 36 of the tension spring 35 and extend said spring 35 as the telescoping member 37 is pushed down into the telescoping member 5. An upper telescoping member 40 is adapted to be mounted in the telescoping member 37 so as to slide freely therein and said telescoping member 40 has at about its middle point or higher, a circular flange 41 integrally mounted on its interior and which is adapted to rest upon the head of the compression spring 39 so that as the telescoping member 40 is telescoped within the telescoping member 37 is will compress the spring 39 and the telescoping member 37 will thereby be pushed down until the circular flange 38 engages the circular plate 36 and pressing down thereon extends the extension spring 35 to its full extended position thereby permitting the complete telescoping of telescoping member 37 within the telescoping member 5.

In order to maintain these telescoping members 5, 37 and 40 in these complete telescoped positions it will be necessary merely to tighten the wing nuts 25 so as to close the clamping rings 22 which is effected through the tightening of the square springs 26 whereby the tightening is effected gradually but effectively. In releasing the wing nuts 25 the releasing of the clamping members 22 will be effected gradually also through the gradual releasing of the square springs 26 thereby preventing the severe and too rapid collapsing and extending of the telescoped members 5, 37 and 40. As the clamp members 22 are thus released the extension spring 35 will effectively raise the telescoping member 37 from its full telescoped position to a normal position and the compression spring 39 will raise the telescoped member 40 to its normal position thereby eliminating the necessity of the operator pulling up on these telescoping members 37 and 40 because of these spring actions as described.

The telescoped member 5 is also connected to the telescoped member 37 by means of a limiting chain 42 which chain is secured to the telescoped member 5 at 43 and to the telescoping member 37 at 44. A limiting chain 45 is also secured between telescoping members 37 and 40 being secured to 37 at 44 and to 40 at 46. These chains 42 and 45 serve to limit the movement of telescoping members 37 and 40 respectively thereby preventing the separation of the same from the telescoping members 5 and 37 respectively.

It is thus seen that in operating my device the extension legs 20 can be adjusted to any desired position no matter how uneven the ground or base on which my device is stood and the portrait camera for which this device is particularly adapted can be quickly raised and lowered to the position desired and particularly the raising can be effected quickly and easily because of the tendency of the telescoping parts to assume normal position when released and accidental raising or lowering or sudden raising or lowering is also prevented by the special clamping construction of my device.

It will be understood that my tripod is particularly adapted to be used in connection with a portrait camera with the tripod head of universal action as shown in my copending application filed simultaneously with this application.

I claim:

1. In a tripod having the usual collapsible legs with an extensible support composed of three telescoping members slidably supported by the collapsible legs, means for fastening said members rigidly together in any desired position, means for gradually releasing said fastening means, means for automatically restoring said members to their normal extended positions from full telescoped position and means for limiting the movement of said members upwardly.

2. In a tripod the usual collapsible legs with an extensible support composed of three telescoping members slidably supported by the collapsible legs, means for fastening said members rigidly together in any desired position comprising split end telescopic members having clamping rings thereover and clamping bolts in said rings, means for gradually releasing said fastening means comprising compression springs mounted over the clamping bolts, means for automatically restoring said members to their normal extended positions from full telescoped position and means for limiting the movement of said members upwardly.

3. In a tripod having the usual collapsible legs with an extensible support composed of three telescoping members slidably supported by the collapsible legs, means for fastening said members rigidly together in any desired position comprising split end telescopic members having clamping rings thereover and clamping bolts in said rings, means for gradually releasing said fastening means comprising compression springs of square cross sectional area mounted over the clamping bolts, means for automatically restoring said members to their normal extended positions from full telescoped position and means for limiting the movement of said members upwardly.

4. In a tripod having the usual collapsible legs with an extensible support composed of three telescoping members slidably supported by the collapsible legs, means for fastening said members rigidly together in any desired position, means for gradually releasing said fastening means, means for automatically restoring said members to their normal extended positions from full telescoped position comprising an extension spring suspended in the base telescopic member, the lower end of the intermediate telescopic member engaging a circular plate attached to the lower end of said spring in its lower position, a compression spring seated in the base of the intermediate telescopic member and a flange in the upper telescopic member engaging the head of said compression spring, and means for limiting the movement of said members upwardly.

5. In a tripod having the usual collapsible legs with an extensible support composed of three telescoping members slidably supported by the collapsible legs, means for fastening said members rigidly together in any desired position, means for gradually releasing said fastening means, means for automatically restoring said members to their normal extended positions from full telescoped position comprising a suspension spring operating between the base telescopic member and the intermediate member and a compression spring operating between the intermediate telescopic member and the upper telescopic member and means for limiting the movement of said members upwardly.

In testimony whereof I affix my signature.

ANTONIUS J. VIKEN.